US 8,126,440 B2

(12) United States Patent
Bose et al.

(10) Patent No.: US 8,126,440 B2
(45) Date of Patent: Feb. 28, 2012

(54) SYSTEM, METHOD AND COMPUTER PROGRAM PRODUCT FOR DISSEMINATING EARLY WARNING MESSAGES

(75) Inventors: Sumit Kumar Bose, Delhi (IN); Srikanth Sundarrajan, Tamil Nadu (IN); Ganesan Malaiyandasamy, Karnataka (IN); Anirban Chakrabarti, Bangalore (IN); Lopamudra Chakrabarti, legal representative, Bangalore (IN); Bhalwan Singh Gurna, Andhra Pradesh (IN); Madhavi Rani, Andhra Pradesh (IN)

(73) Assignee: Infosys Technologies Limited (IN)

( * ) Notice: Subject to any disclaimer, the term of this patent is extended or adjusted under 35 U.S.C. 154(b) by 335 days.

(21) Appl. No.: 12/384,778

(22) Filed: Apr. 8, 2009

(65) Prior Publication Data

US 2009/0311986 A1 Dec. 17, 2009

(30) Foreign Application Priority Data

Apr. 8, 2008 (IN) .............................. 880/CHE/2008

(51) Int. Cl.
*H04M 3/42* (2006.01)

(52) U.S. Cl. ................................. 455/414.1; 455/404.1

(58) Field of Classification Search ............... 455/404.1, 455/404.2, 414.1, 414.13, 567; 340/426.18, 340/426.2, 426.22
See application file for complete search history.

(56) References Cited

U.S. PATENT DOCUMENTS

| 2004/0203562 | A1* | 10/2004 | Kolsrud | ..................... 455/404.1 |
| 2008/0258880 | A1* | 10/2008 | Smith et al. | ............. 340/286.02 |
| 2009/0111474 | A1* | 4/2009 | Hill et al. | ...................... 455/445 |

* cited by examiner

*Primary Examiner* — Kamran Afshar
*Assistant Examiner* — Kenneth Corbin
(74) *Attorney, Agent, or Firm* — Lerner, David, Littenberg, Krumholz & Mentlik, LLP

(57) ABSTRACT

A method for disseminating Early Warning Messages (EWMs) to subscriber terminals by an Early Warning Unit (EWU) in a mobile communication network is provided. The method comprises identifying at least one base station in a first region and sending a trigger signal to the identified base station for initiating the dissemination of the EWMs. The method further comprises sending an invitation request to one or more peer base stations in a second region and receiving subscriber details from one or more base stations. The method furthermore comprises selectively disseminating the EWMs to the one or more subscriber terminals based on location details of the subscriber terminals using a grid computing architecture. The grid computing architecture facilitates parallel dissemination of the EWMs to the one or more subscriber terminals by splitting the subscriber details into one or more data fragments.

18 Claims, 6 Drawing Sheets

SYSTEM, METHOD AND COMPUTER PROGRAM PRODUCT FOR DISSEMINATING EARLY WARNING MESSAGES

FIELD OF THE INVENTION

The present invention, generally, relates to the field of early warning systems. More particularly, the present invention relates to a system and method for disseminating early warning messages effectively using mobile communications and grid computing architectures.

BACKGROUND OF THE INVENTION

With frequent occurrences of natural calamities, such as, earthquake, floods, tsunami, cyclone, tornado, volcano, fire hazards, epidemic prone diseases etc., Early Warning Systems (EWS) are in great demand. Typically, an Early Warning System (EWS) is a timely surveillance system, which collects information about natural calamities and triggers warning alerts (also referred as Early Warning Message (EWM)) to public in a geographical area of the natural calamity. However, traditional EWS are rudimentary and are of passive nature such as television, radio and World Wide Web (WWW) etc. EWS based on such public broadcast mechanisms are often unreliable as the person likely to be affected by a calamity need to be attentively watching the television or to be listening to the radio as the news of the likely calamity is being broadcast. In such cases, news of impeding danger not reaching a person likely to be affected by the forthcoming calamity is extremely high.

Until very recently the above were the only modes of conveying the news of the imminent calamity. In the recent years, a few active EWS have been proposed to overcome the passiveness inherent in the traditional modes of conveying warning messages. For example, the automatic telephone notifications of locations in a tornado path to people whose contact numbers are registered with the early warning system. However, there are only a handful of such active early warning systems and are largely associated with a number of drawbacks. For instance, when an attempt is made to contact a large set of people in a short time interval, network bandwidth becomes a bottleneck.

A further drawback, in case of automatic telephone notification is that a user (also referred as subscriber) needs to register his telephone number with the EWS and if he fails to do so, he is not informed of calamity even if he is in the affected region. Furthermore, the EWS, typically, continues to deliver EWM to a user if he has moved out of the affected region and is not currently present therein. Such situations are commonly encountered in tourist destinations.

In yet another scenario, since the subscriber's telephone number is linked to the zip code and the telephone prefix information, the aforementioned EWS will repeatedly try to contact and notify the subscriber even though the subscriber is not physically located in the area (the area to be affected by the calamity), thus wasting network resources and causing inconvenience to the subscriber. In other words, on one hand the EWS will necessarily try to establish contact with the subscriber even though the subscriber is not physically present at the affected region. On the other hand, the EWS will fail to inform subscribers whose zip code information and the telephone prefix information does not match that of the geographic area of his current location.

Still further, use of existing EWS does not guarantee that the intended subscriber has indeed received the news i.e. there is no confirmation that the message has indeed been delivered and has been read by the subscriber. For example, in the case of flush floods during the night time, it is quite likely that most of the people would be asleep and may not take the call or may have switched their cell phones off. In such instances, the current EWS make no attempt to reach these persons through alternative means.

Furthermore, in any disaster management scenario, there may be situations where people may be crossing affected regions. The EWS will fail to notify EWM to such people as telephone numbers with zip code and the telephone prefix information do not belong to the affected regions and are not registered with the EWS. Still further, existing EWS do not address network bandwidth becoming a bottleneck when extremely large set of people need to be addressed in shortest possible time interval.

Thus, there is a requirement of a robust, holistic and cost effective EWS designed to overcome the above-mentioned limitations that delivers EWM efficiently where subscribers are geographically dispersed and message is to be delivered in the shortest possible time.

BRIEF SUMMARY OF THE INVENTION

A method for disseminating Early Warning Messages (EWMs) to one or more subscriber terminals by an Early Warning Unit (EWU) in a mobile communication network is provided. The method comprises identifying at least one base station in a first region for disseminating the EWMs; sending a trigger signal to the at least one base station for initiating the dissemination of the EWMs; sending an invitation request by the at least one base station to one or more peer base stations in a second region; receiving subscriber details of the one or more subscriber terminals by the EWU, wherein the subscriber details of the one or more subscriber terminals are sent by the at least one base station and the one or more peer base stations; and selectively disseminating the EWMs to the one or more subscriber terminals based on location details of the subscriber terminals using a grid computing architecture. The grid computing architecture facilitates parallel dissemination of the EWMs to the one or more subscriber terminals by splitting the subscriber details into one or more data fragments.

In an embodiment of the present invention, the method further comprises receiving subscriber details of the one or more subscriber terminals serviced by the at least one base station in a second region.

In an embodiment of the present invention, the first region is an epicenter region of one or more natural calamities and the second region is a region adjoining the first region.

In an embodiment of the present invention, the at least one base station is identified based on matching geographical location of the at least one base station with data pertaining to the first region.

In an embodiment of the present invention, the method further comprises assigning a priority level to each subscriber terminal based on the geographical location of the one or more subscriber terminals; and disseminating the EWMs to the one or more subscriber terminals based on the corresponding priority levels.

In an embodiment of the present invention, a highest priority is assigned to the subscriber terminals having residence in an epicenter area and being currently located in the epicenter area.

In an embodiment of the present invention, a lowest priority is assigned to the subscriber terminal not having residence in an epicenter area and not being currently located in the epicenter area.

A system for disseminating Early Warning Messages (EWMs) to one or more subscriber terminals by an Early Warning Unit (EWU) in a mobile communication network is provided. The system comprises one or more subscriber terminals, one or more base stations and EWU. The one or more base stations comprises a receiving unit configured to receive a trigger signal from the EWU; a first transmitting unit configured to send an invitation request by a base station to at least one peer base station; a second transmitting unit configured to send subscriber details of the subscriber terminals to the EWU; and an output unit configured to deliver the EWMs to the EWU for selective dissemination of the EWMs to the subscriber terminals. The EWU comprises a first output unit configured to send a trigger signal to the one or more base stations; a first database configured to maintain updated subscriber details serviced by the one or more base stations; and a second output unit configured to facilitate selective dissemination of the EWMs to the one or more subscriber terminals and to employ a grid computing architecture for facilitating parallel dissemination of the EWMs to the one or more subscriber terminals.

In an embodiment of the present invention, the EWU further comprises a second database configured to store details of the one or more base stations.

In an embodiment of the present invention, the EWU further comprises a third database configured to store details of regions prone to risk of one or more natural calamities.

In an embodiment of the present invention, the EWU further comprises an identifying unit configured to identify at least one base station in at least one region prone to risk of one or more natural calamities.

In an embodiment of the present invention, the one or more base stations further comprises an input/output unit configured to send or receive message to or from the at least one peer base station to deliver the EWMs to the EWU.

In an embodiment of the present invention, the second output unit is configured to facilitate selective dissemination of the EWMs to the at least one subscriber terminal by assigning a priority level to each subscriber terminal based on geographical location of the subscriber terminal.

A computer program product comprising a computer usable medium having a computer readable program code embodied therein for disseminating Early Warning Messages (EWMs) to one or more subscriber terminals by an Early Warning Unit (EWU) in a mobile communication network is provided. The computer program product comprises, program instruction means for identifying at least one base station in a first region for disseminating the EWMs, program instruction means for sending a trigger signal to the at least one base station for initiating the dissemination of the EWMs, program instruction means for sending an invitation request by the at least one base station to one or more peer base stations in a second region, program instruction means for receiving subscriber details of the one or more subscriber terminals by the EWU. The subscriber details of the one or more subscriber terminals are sent by the at least one base station and the one or more peer base stations. The computer program product further comprises program instruction means for selectively disseminating the EWMs to the one or more subscriber terminals based on location details of the subscriber terminals using a grid computing architecture. The grid computing architecture facilitates parallel dissemination of the EWMs to the one or more subscriber terminals by splitting the subscriber details into one or more data fragments.

In an embodiment of the present invention, the computer program product further comprises program instruction means for receiving subscriber details of the one or more subscriber terminals serviced by the at least one base station in a second region.

In an embodiment of the present invention, wherein the computer program product further comprises program instruction means for selectively disseminating the EWMs. The program instruction means for selectively disseminating the EWMs further comprises program instruction means for assigning a priority level to each subscriber terminal based on the geographical location of the one or more subscriber terminals and program instruction means for disseminating the EWMs to the one or more subscriber terminals based on the corresponding priority levels.

In an embodiment of the present invention, the computer program product further comprises program instruction means for sending a message to the one or more peer base stations by the at least one base station. The message directs the one or more peer base stations to deliver the EWMs to the EWU for dissemination.

BRIEF DESCRIPTION OF THE DRAWINGS

The present invention is described by way of embodiments illustrated in the accompanying drawings wherein.

DETAILED DESCRIPTION

A system and method for providing an efficient and cost effective early warning system are described herein. The invention provides for a system that facilitates efficient dissemination of EWM to subscribers by employing mobile communication network and grid computing architectures.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
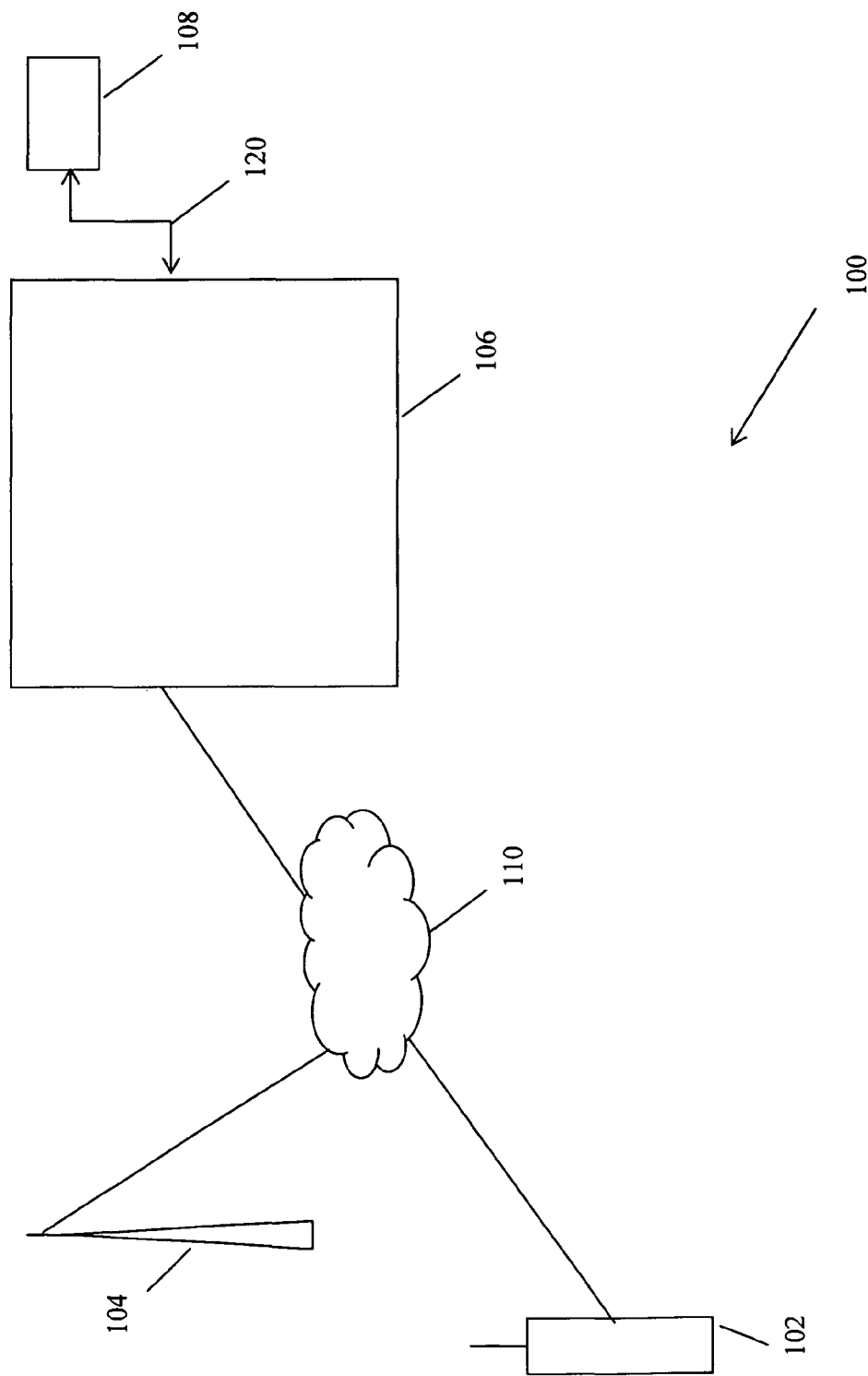
FIG. 1 is a mobile communication network operating in accordance with an embodiment of the present invention.

FIG. 1 is a block diagram illustrating a mobile communication network 100 operating in accordance with an embodiment of the present invention. The mobile communication network 100 comprises a subscriber terminal 102, base station 104, an Early Warning Unit (EWU) 106 and a remote sensing system 108.

Mobile communication network 100 is a network where one or more users/subscribers and nodes communicate with each other over a medium 110 using mobile communications standards. Examples of mobile communications standards include, but are not limited to, Global System for Mobile communication (GSM), Code Division Multiple Access (CDMA) or any other mobile telephony network.

Subscriber terminal 102 is a device which may be used by a user/subscriber for communicating with other users in the mobile communication network 100. In an embodiment of the present invention, the subscriber terminal 102 may be a wireless/handheld device. Examples of subscriber terminal 102 include, but are not limited to, cellular phones, personal digital assistants, laptops, notebooks, portable navigators, etc.

Base station 104 is an entity which provides subscriber terminals 102 access to network resources in a mobile communication network 100. In an embodiment of the present invention, the base station 104 is a transceiver which may be used to transmit and receive voice and data to and from the subscriber terminal 102. In various embodiments of the present invention, the base station 104 may service one or more subscriber terminals 102 and may be operated by different service providers.

EWU 106 is an entity which may be used to facilitate dissemination of Early Warning Messages (EWMs) to the subscriber terminal 102. In an embodiment of the present invention, the EWM is an alert message informing the subscriber terminals 102 of occurrence of one or more natural calamities (e.g. earthquake, cyclone, tornado, hurricane etc.). The EWU 106 may be centrally managed by authorities responsible for combating the effects of one or more natural calamities.

Remote sensing system 108 is an entity which may be used to facilitate collection of data on geographical area/location to be affected by one or more natural calamities from one or more external systems. Examples of remote sensing system 108 include, but are not limited to, a radar system, a sonar system, a seismograph etc. In an embodiment of the present invention, the remote sensing system 108 may be a radar system which may be used to collect data (e.g. geographical coordinates) of a location to be affected by tornado from a meteorological department.

Operationally, in an embodiment, the EWU 106 communicates with the remote sensing system 108 to receive data pertaining to the area likely to be affected by natural calamities (also referred as epicenter). In various embodiments of the present invention, the data may be obtained from one or more known external systems capable of detecting natural calamities using known techniques. The natural calamities may also impact the regions that surround the epicenter (also referred as peripheral zone). In an embodiment of the present invention, the remote sensing system 108 may be a radar system that collects data, from a meteorological department, regarding geographical area to be affected by, say, a tornado. The data, for example, may be geographical coordinates of the epicenter. Based on the data obtained from the radar system, the EWU 106, using known techniques, derives information of the geographic area which has a significant possibility of being in the tornado path.

In various embodiments of the present invention, the remote sensing system 108 may communicate with the EWU 106 via a communication link 120. The communication link 120 can be a direct hard wired connection, or can be any other suitable method of connection, such as land line, cellular telephone, radio communications, satellite interface, wireless interface, computer network interface such as the Internet, etc. It will be appreciated that the link is defined by performance characteristics suitable for efficient communication between the early warning unit 106 and the base station 104. In addition, it will be intuitive to those skilled in the art that the EWU 104 and the radar system 108 can be remotely located or may be located in the same facility.

In an embodiment of the present invention, the EWU 106 communicates with the base station 104 over the medium 110 using the information derived from the remote sensing system 108 to communicate with the base station 102 for facilitating dissemination of EWM for facilitating dissemination to the subscriber terminal 102.

Alternately, in an embodiment, authorities managing the EWU 106 can demarcate the region (e.g. tourist destination and similar places with high population density) a-priori within which EWM are to be disseminated using known techniques. Accordingly, the EWU 106 communicates with the base station 102 that lies within the demarcated region for facilitating dissemination of EWM to the subscriber terminal 102.

Figure 2:
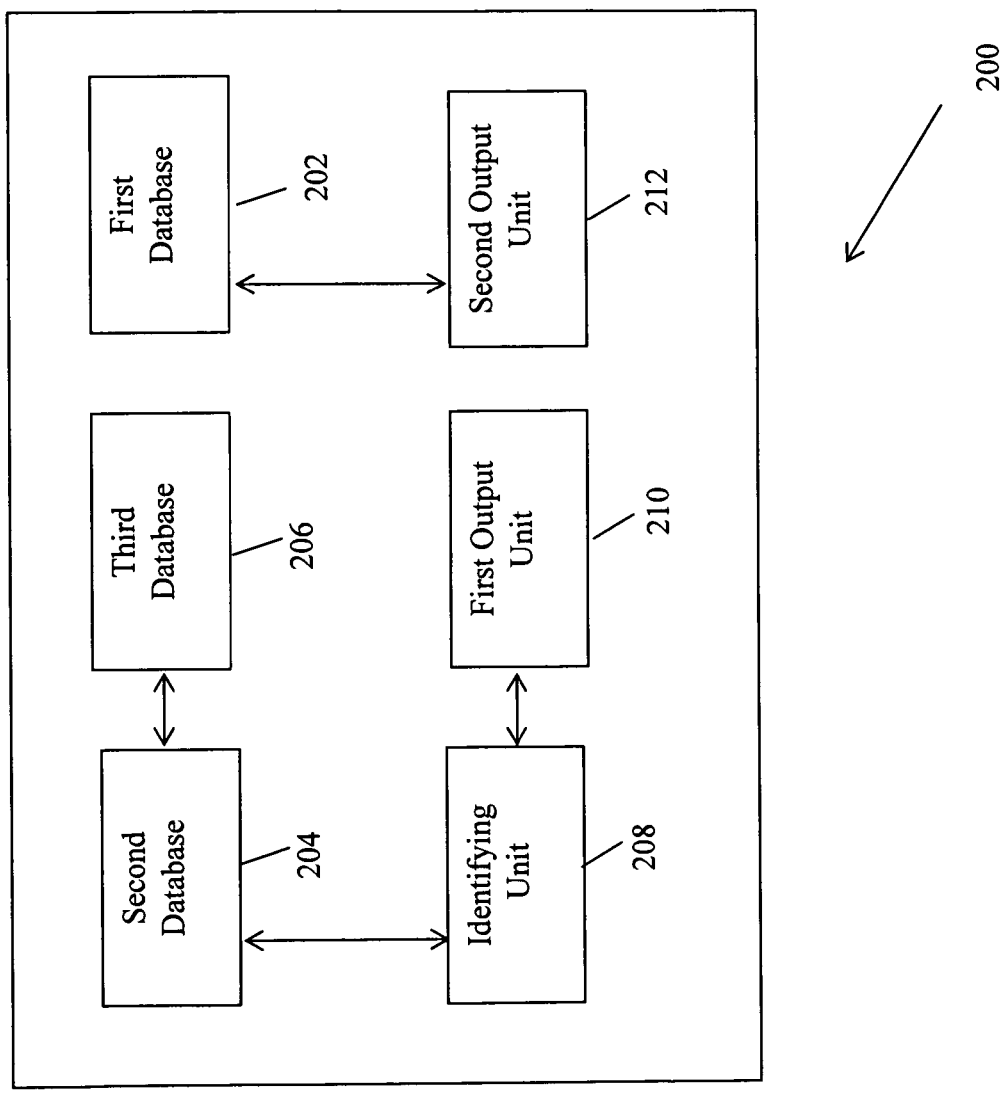
FIG. 2 is a block diagram of an early warning unit in accordance with an embodiment of the present invention.

FIG. 2 is a block diagram illustrating components of an EWU 200 in accordance with an embodiment of the present invention. EWU 200 includes a first database 202, a second database 204, a third database 206, an identifying unit 208, a first output unit 210, and a second output unit 212.

First database 202 is an entity that may be configured to maintain details of the subscriber terminals 102. In an embodiment of the present invention, the details may include zip code information and telephone prefix information associated with the subscriber terminals 102.

Second database 204 is an entity that may be configured to maintain data regarding geographical location of one or more base stations 104 (FIG. 1). In an embodiment of the present invention, the data can be zip code information of the base station 104 or any other data that enables identification of a particular base station 104 servicing a portion of a particular geographical area.

Third database 206 is an entity that may be configured to maintain data regarding geographical areas to be affected by natural calamities (e.g. earthquake, cyclone, tornado etc.). In an embodiment of the present invention, the data (e.g. geographical coordinates of the area to be affected by natural calamities) may be obtained from the remote sensing system 108 (FIG. 1).

Identifying unit 208 is an entity that may be configured to identify base stations 104 in the geographical area to be affected by one or more natural calamities. In an embodiment of the present invention, the identifying unit may be a computing system capable of processing data stored in the second database 204 and the third database 206 to identify the base station 104. Known techniques may be employed to process the stored data and obtain information regarding the location of the base station 104 stationed in the area to be affected by one or more natural calamities.

First output unit 210 is an entity that may be configured to send a trigger signal to the base station 104. In an embodiment, the first output unit 210 may be a computing system capable of generating the trigger signal. The trigger signal triggers the base station 104 to commence the process to disseminate EWMs.

Second output unit 212 is an entity that may be configured to facilitate dissemination of EWMs to the subscriber terminal 102 (FIG. 1). In an embodiment of the present invention, the second output unit 212 may be a computing system that facilitates dissemination of EWMs selectively to the intended subscriber terminal 102. The second output unit 212 uses grid computing architecture that facilitates massive parallel dissemination of EWMs quickly and at low cost. In various embodiments of the present invention, use of grid computing architecture result in usage of idle computers across state or country for generating EWMs and for performing computation intensive calculations associated with selective dissemination. The grid computing architecture may enable distribution of the calculations onto a distributed infrastructure resulting in lowering of overall cost. In an embodiment of the present invention, a grid management system may be able to gather information from different grid resources and feed the information to a grid workflow manager, which may distribute the calculations over the infrastructure based on resource usage. Use of grid computing architecture therefore enables to bring down the execution time and total cost of ownership.

In an alternate embodiment, the second output unit 212 may be functionally connected to a central messaging gateway (not shown). In this embodiment, the central messaging gateway may store the details of the subscriber terminal 102 received from the base station 104. In various embodiments of the present invention, the central message gateway leverages a grid computing architecture to disseminate the EWMs in parallel to the intended subscriber terminals 102 (FIG. 1).

Operationally, in an embodiment, the identifying unit 208 may use known techniques to obtain information regarding the geographical area that is to be affected based on the data stored in the second database 204. For example, the geographic area may be represented as a trapezoid shape defined by four corner points or an irregular shape with an unlimited number of border points may be formed to represent the geographic area. In various embodiments of the present invention, known techniques may be employed by the identifying unit 108 to process the data stored in the second database 204 and the third database 206 to perform matching of the data to identify the at least one base station. In another embodiment, the identifying unit 108 is operated by external authorities (as mentioned in para 0029) to perform the identification using data stored in the first database 202.

Subsequently, the first output unit 210 operates in conjunction with the identifying unit 208 to generate the trigger signal. The trigger signal is communicated to the base station 104 by the medium 110 using any suitable method. In various embodiments of the present invention, the second output unit 212 facilitates dissemination of the EWM using grid computing architecture that allows massive parallel dissemination of EWM quickly and at low cost. Typically, using grid technology, the subscriber details received from the one or more base stations 104 is processed at the second output unit 212 to be chunked for parallel dissemination of the EWMs. In particular, data from each base station 102 (FIG. 1) is processed individually that results in massive parallelism for quick dissemination of the EWMs.

In an alternate embodiment of the present invention, subscriber details of subscriber terminals 102 (FIG. 1) and the EWMs are sent by the base station 104 to the centralized message gateway that is functionally connected to the second output unit 212 (FIG. 2). The centralized message gateway leverages a grid infrastructure to selectively disseminate the EWM in parallel to all the intended subscriber terminals 102 (FIG. 1). For example, a Job Farming Framework (JFF) in a grid workflow manager may be leveraged to chunk the details received from the base stations 104 into a shorter list for parallel dissemination of the EWMs to the intended subscriber terminals 102 (FIG. 1).

Figure 3:
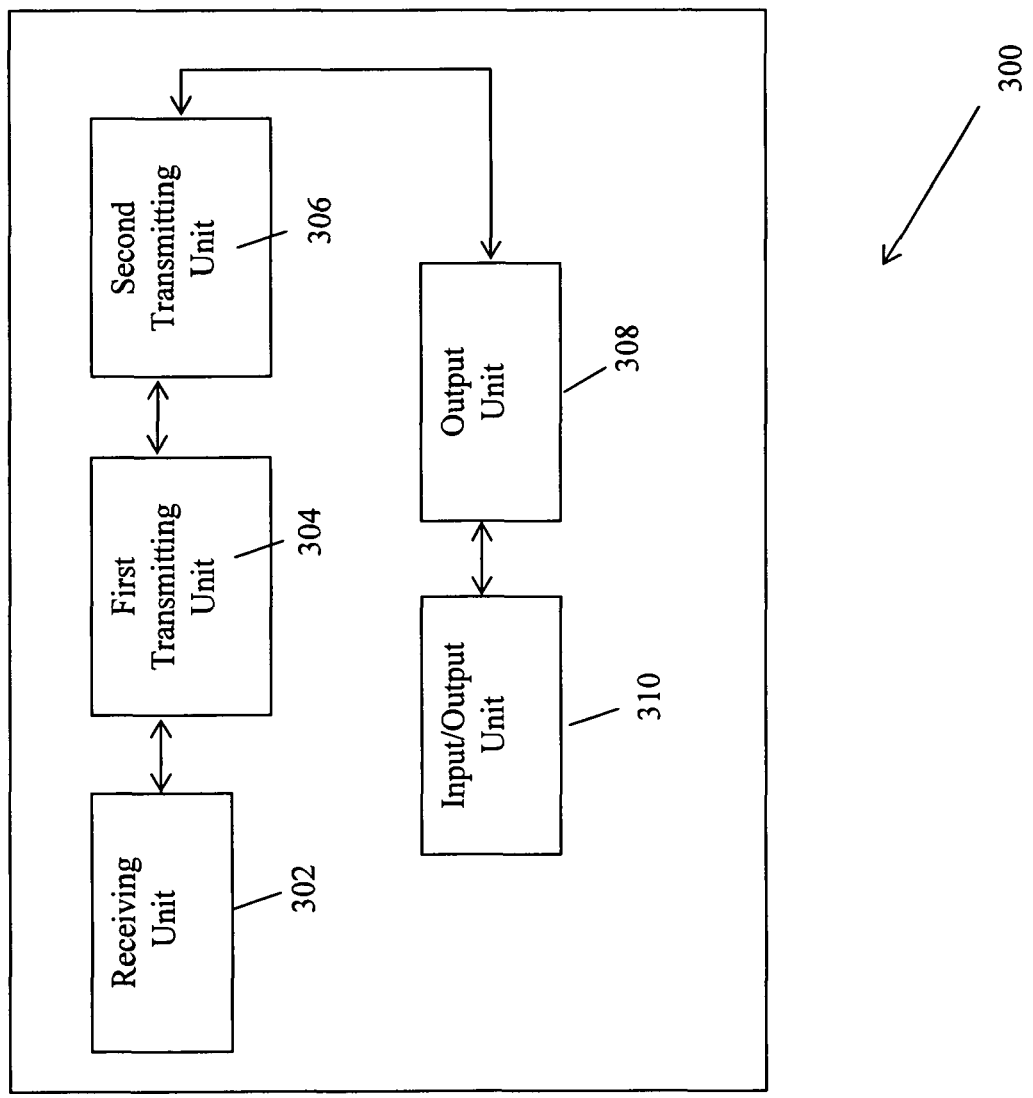
FIG. 3 is a block diagram of a base station in accordance with an embodiment of the present invention.

FIG. 3 is a block diagram illustrating components of a base station 300 in accordance with an embodiment of the present invention. The base station 300 includes a receiving unit 302, a first transmitting unit 304, a second transmitting unit 306, an output unit 308 and an input/output unit 310.

In an embodiment of the present invention, the base stations are linked to the EWU. In case of a natural calamity, be it earth quakes or thunderstorms or hurricane, there is an epicenter which is likely to be the most affected areas and adjoining area and may affect the adjoining areas, called the peripheral region, as well. The epicenter zone and the peripheral zone may be spread over several base stations.

Receiving unit 302 is an entity that may be configured to receive the trigger signal (referred in description of FIG. 2). In an embodiment of the present invention, the receiving unit 302 may be a computing system capable of receiving and reading the EWMs contained in the trigger signal.

First transmitting unit 304 may be an entity configured to communicate with peer base stations 300 servicing one or more subscriber terminals 102 (FIG. 1), in a cellular architecture, in the neighboring areas. In an embodiment of the present invention, the first transmitting unit 304 may be a computing system operative to transmit a request to the peer base stations 300 to participate in sending EWMs to the subscriber terminals 102. In various embodiments of the present invention, the request may be an invitation message transmitted to the peer base stations 300 over the medium 110 (FIG. 1) to participate in sending EWM to the subscriber terminals 102. (FIG. 1)

Second transmitting unit 306 is an entity that may be configured to transmit details of the subscriber terminals 102 to the EWU 106 (FIG. 1). In an embodiment of the present invention, the second transmitting unit 306 is a computing system configured to send subscriber details (e.g. zip code information, telephone number prefix associated with the mobile number) to the EWU 106.

Output unit 308 may be an entity configured to deliver the EWM to the EWU 106 for disseminating the EWM to the subscriber terminal 102. In an embodiment of the present invention, the output unit 308 is a computing system capable of processing data for generating and transmitting EWM to the EWU 106 over the medium 110. In another embodiment of the present invention, the output unit 308 is configured to deliver the EWM to the subscriber terminals 102 through a central message gateway (as described in FIG. 2).

Input/output unit 310 is an entity that may be configured to send or receive messages to or from peer base stations 300. The message represents data to initiate delivery of EWM to the subscriber terminals 102. In an embodiment of the present invention, the input/output unit 310 may be a computing system capable of processing data to generate a message that informs the peer base stations 300 of the commencement of the delivery of the EWM to the subscriber terminals 102. In various embodiments of the present invention, the peer base station 300 may be the originating base station 300 that sends the message to the peer base stations 300 via the input/output unit 310. In an embodiment of the present invention, a single delivery of the EWMs from the base stations 300 and peer base stations 300 may include hundreds to thousands of subscriber terminals 102 currently within its reach. Once the EWMs are delivered, the base station 300 and the peer base stations 300 remembers its state as messages delivered. In an alternate embodiment, the base stations 300 and the peer base stations 300 delivers the EWMs and the subscriber details to the central message gateway along with the subscriber details.

Operationally, in various embodiments of the present invention, the base station 300 receives the trigger signal from the EWU 106 (FIG. 1) and sends the invitation request to the peer base station 300 to participate in disseminating the EWMs. Then, the base station 300 sends the subscriber details of the subscriber terminals 102 (FIG. 1) and the EWMs to the EWU 106 (FIG. 1). Upon sending the EWMs for delivery to the EWU 106 or the central message gateway (without waiting for acknowledgement), the base station 300 sends messages to the peer base stations 300 to initiate the message delivery. In an embodiment, this message may be propagated through flooding. The flooding process is discussed in detail with respect to FIG. 6. This ensures all the subscriber terminals 102 (FIG. 1) within the purview of all the participating base stations receive the EWMs.

Figure 4:
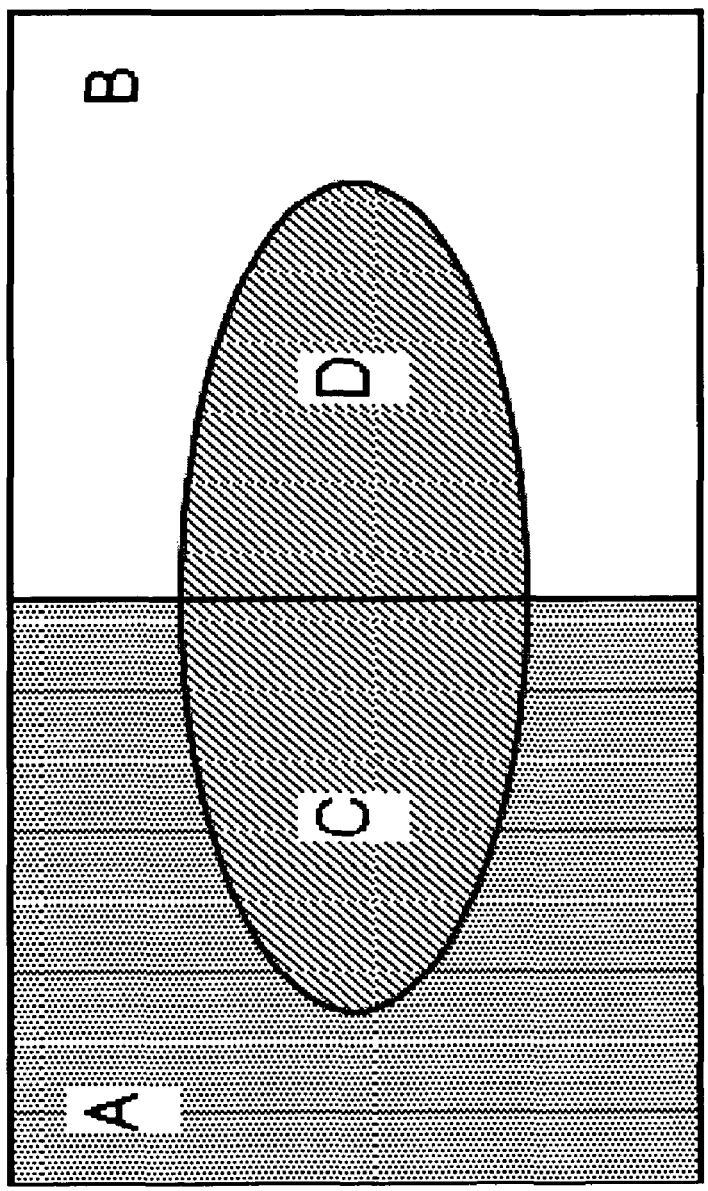
FIG. 4 is an exemplary block diagram depicting the categorization of subscriber terminals based on geographical location of the subscriber terminals in accordance with an embodiment of the present invention.

Referring to FIG. 4, in an embodiment of the present invention, the second output unit 212 (FIG. 2) is configured to segregate the subscriber terminals 102 (FIG. 1) into four classes based on their current locations. Accordingly, priority levels are assigned and EWM is disseminated to the subscriber terminals 102 (FIG. 1) selectively (hereinafter referred as intended subscriber terminals 102) based on the following categorization into class A, B, C and D.
  (i) Class A: Subscriber terminals 102 (FIG. 1) having their residence in an epicenter of the geographical location identified to be impacted by natural calamity (also referred as risk zone or first region) but are not physically present in the epicenter area.
  (ii) Class B: Subscriber terminals 102 (FIG. 1) having their residence elsewhere and are not physically present in the epicenter. These are the subscriber terminals 102 (FIG. 1) present in the peripheral zone (also referred as second region).
  (iii) Class C: Subscriber terminals 102 (FIG. 1) having their residence in the epicenter area and are physically present in the epicenter area.
  (iv) Class D: Subscriber terminals 102 (FIG. 1) having their residence elsewhere and are physically present in the epicenter area.

Subscriber terminals 102 (FIG. 1) belonging to class C and class D are at greatest risk from the natural calamity. Accordingly highest priority may be assigned to class C and class D subscriber terminals 102 (FIG. 1) for sending out the EWM. Class A and class B subscriber terminals 102 (FIG. 1) are assigned lower priorities. In particular, a low priority is assigned to the subscriber terminals 102 if the zip code or telephone pre-fix information of the subscriber terminals 102 (FIG. 1) indicate their association with the epicenter (e.g. by virtue of their residence being there) but are not physically present in the location at the moment as the subscriber terminals 102 are already out of danger zone.

In an embodiment of the present invention, with respect to class B, since the subscriber terminals 102 (FIG. 1) are currently present in the peripheral zone/second region, movement of each individual in this set is monitored for a fraction of time.

Figure 5:
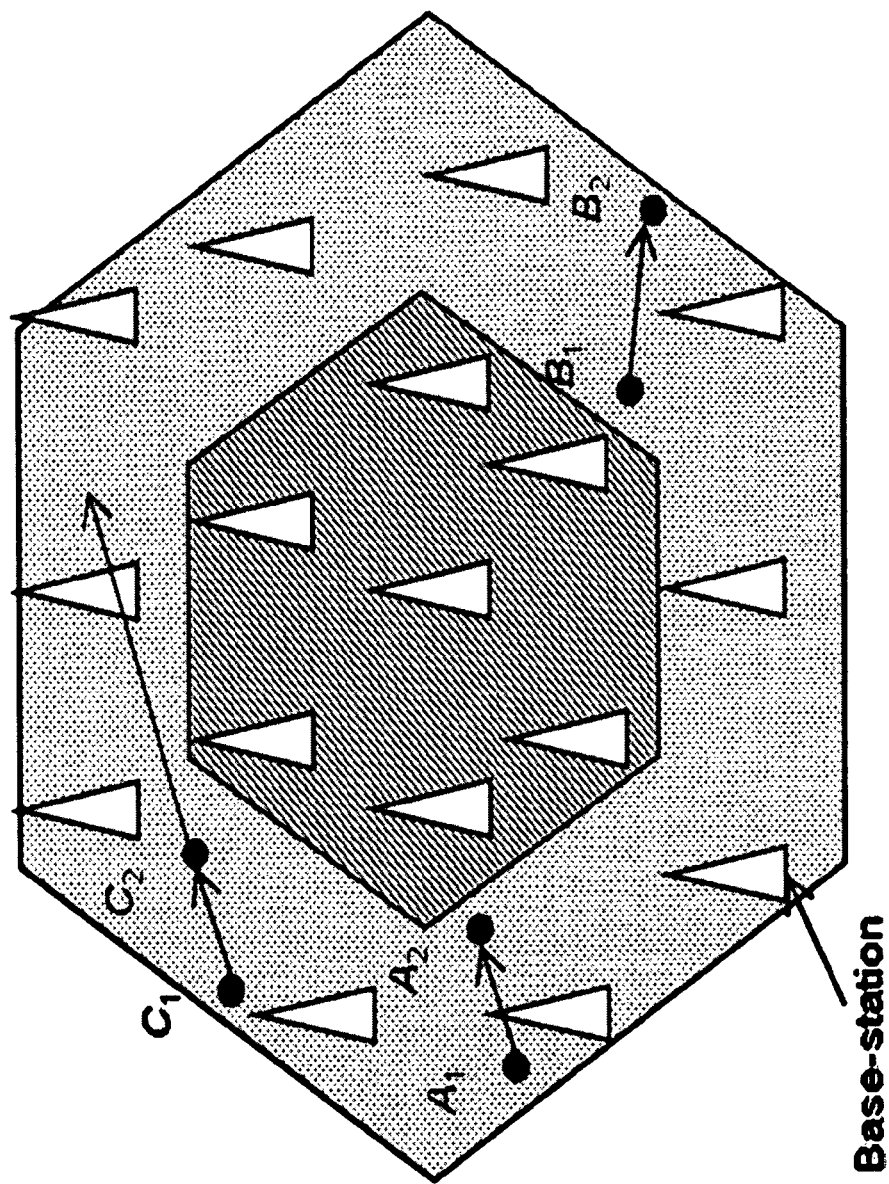
FIG. 5 is an exemplary contour diagram illustrating a procedure for monitoring the movement of subscriber terminals in accordance with an embodiment of the present invention.

FIG. 5 is an example contour diagram illustrating the monitoring procedure. For example, if the subscriber terminal 102 is in location $B_1$ at time t and is in location $B_2$ at time t+xT, then from the direction of travel, it can be determined whether the subscriber terminal's 102 (FIG. 1) path passes through the epicenter. Subscriber terminal 102 (FIG. 1) detected to be travelling away from the epicenter may not receive the EWM (for example subscriber terminal 102 (FIG. 1) at position $B_1$ in FIG. 5). In addition, subscriber terminals 102 (FIG. 1) not likely to pass through the epicenter may not receive EWM (for example subscriber terminal 102 (FIG. 1) at position C in FIG. 6). The subscriber terminals 102 (FIG. 1) likely to pass through the epicenter zone may receive the EWM (for example subscriber terminal 102 in FIG. 1).

In various embodiments of the present invention, in the event of a hand off when a subscriber terminal 102 moves from one base station to a peer base station, the EWU 106, 200 (FIG. 1 and FIG. 2) examines to see if the two base station 104, 300 involved in the hand off have completed their message delivery (discussed in detail with respect to message delivery). The EWU 106, 200 (FIG. 1 and FIG. 2) causes the peer base station 104, 300 (FIG. 1 and FIG. 3) to send the EWM to the subscriber terminal 102 in the event the base station 104, 300 (FIG. 1 and FIG. 3) has not completed delivery of the EWM to the subscriber terminal 102.

In various embodiments of the present invention, after certain pre-defined time (say a week) has elapsed and if the probability of a subscriber terminal 102 (FIG. 1) returning to the epicenter is low, the subscriber details can be purged from the EWU 106, 200 (FIG. 1 and FIG. 2). Thus, the EWM may be disseminated to only those subscriber terminals 102 (FIG. 1) which are physically present in the epicenter. Keeping such subscriber terminals 102 (FIG. 1), which are already out of the epicenter, low in the priority list saves precious time. Thus, the present invention is capable of informing subscriber terminals 102 (FIG. 1) even if zip code information and the telephone prefix information of the subscriber terminals 102 (FIG. 1) do not match with the geographic area of the subscriber terminal 102 (FIG. 1) current location. By assigning highest priority to subscriber terminals 102 (FIG. 1) physically present at that moment in the area, even though their zip code information and the telephone prefix information does not match that of the geographic area of the subscriber terminals 102 current locations, it is ensured that they are safely evacuated well in time. By assigning low priority to such subscriber terminals 102 (FIG. 1) not physically present in the area but have zip code information and the telephone prefix information of the geographic area to be affected by the calamity, it is ensured that these set of subscriber terminals 102 (FIG. 1) are informed only after the subscriber terminals 102 (FIG. 1) facing the highest risk have been informed. By giving least priority to these subscriber terminals 102 (FIG. 1), it is ensured that these set of subscriber terminals 102 (FIG. 1) facing the lowest risk are only warned not to return back till the threat subsides.

In various embodiments of the present invention, the EWM is disseminated only when a confirmation is received from the subscriber terminal 102 (FIG. 1) that the message has been read. If for some reason the confirmation does not reach, the subscriber terminal 102 (FIG. 1) is contacted through alternate means. This may involve finding out the subscriber terminal's 102 (FIG. 1) residential address from his mobile/telephone number by backtracking into the base station 104, 300 (FIG. 1 and FIG. 3) of the service provider and finding out the telephone/mobile number of the next to kin having the same residential address and making a phone call to the number of the subscriber terminals 102 (FIG. 1) next to kin.

Figure 6:
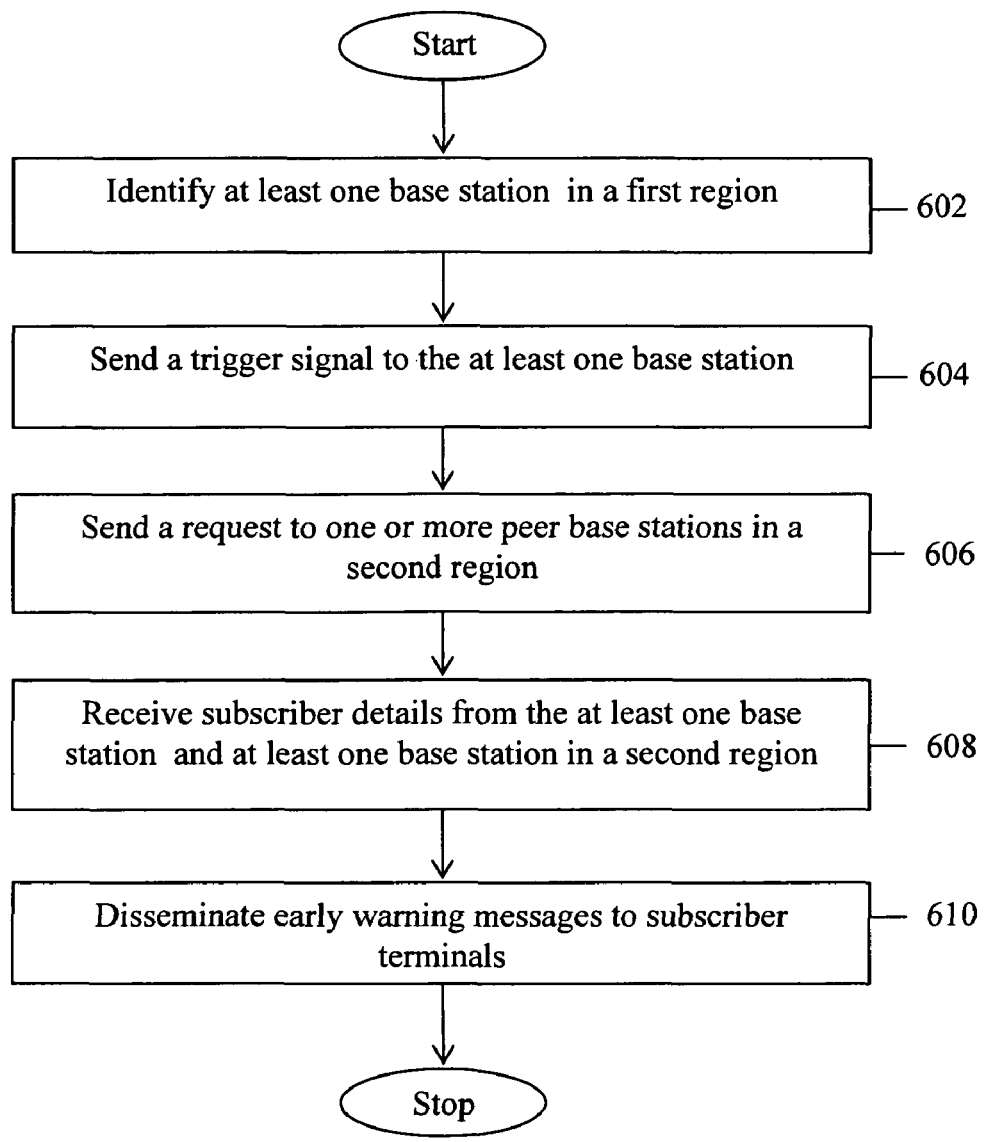
FIG. 6 is an exemplary flowchart illustrating a method of disseminating EWM performed by the early warning unit in accordance with an embodiment of the present invention.

FIG. 6 is an exemplary flowchart illustrating a method of disseminating EWM in accordance with an embodiment of the present invention.

At step 602, at least one base station in a geographical area to be affected by one or more natural calamities (also referred as first region) is identified. In an embodiment of the present invention, the first region is an epicenter region of one or more natural calamities. In another embodiment of the present invention, the at least one base station is identified based on matching geographical location of the at least one base station with data pertaining to the first region.

At step 604, a trigger signal is sent to the base station identified to be in the first region. The trigger signal initiates the dissemination of EWMs to the subscriber terminals located in areas to be affected by one or more natural calamities.

At step 606, a request is sent by the base station to one or more peer base stations. In various embodiments of the present invention, peer base stations are base stations that serve a second region i.e. the area peripheral to the epicenter. The request is for participating in the dissemination of EWMs. Thus, the base station commences the process of establishing a coverage area of the epicenter and the peripheral area where the EWMs are required to be disseminated. Further, the base station sends a message to one or more peer base stations. The message represents data to initiate delivery of EWMs to the EWU for dissemination.

In an embodiment, the base station in the epicenter transmits the request using a flooding hop count method. Typically, flooding hop-count is the relative distance of a particular base station from the epicenter. In the flooding hop-count method, a flooding message is transmitted on a spare link. The flooding message may include a message type field, a sender node ID field (in this case an originating base station), an index field, a chooser node ID field and a hop count field containing certain number of hop counts. Typically, a hop count is a value that may be pre-configured in the flooding message in the hop count field and is decremented by one while passing from one base station to another. In an embodiment of the present invention, based on the nature and severity of the disaster/calamity, the flooding hop-counts are determined.

In various embodiments of the present invention, base stations containing a certain number of flooding hop counts that indicate proximity to the epicenter are selected as the originating base station. Subsequently, the base station transmits the request to the peer base stations to participate in the dissemination by forwarding the request with the current flooding hop-count. Flooding hop-count is reduced by one, each time the request is sent from one base station to another base station. This process is continued till the flooding hop-count is zero. In an embodiment of the present invention, any base station, which has a flooding hop count larger than the incoming request, may ignore future requests from peer base stations.

At step 608, the EWU receives details of the subscriber terminals from the base station. Further, the EWU receives details of the subscriber terminals from one or more peer base stations. For example, the details may include zip code or telephone prefix information associated with the mobile/telephone of the subscriber terminal. Thus, in an embodiment, the base station detects presence of a subscriber terminal in its vicinity and sends the details to the EWU using the second transmitting unit configured in the base station. In another embodiment of the present invention, when a subscriber terminal leaves the epicenter, the information is relayed to the EWU.

At step 610, the EWMs are disseminated selectively to the subscriber terminals based on location details of the subscriber terminals. In particular, in an embodiment, the EWMs are disseminated using a grid computing architecture, wherein the grid computing architecture facilitates parallel dissemination of the EWMs to the one or more subscriber terminals by splitting the subscriber details into one or more data fragments. In various embodiments of the present invention, the dissemination of EWMs is performed by assigning a priority level to each subscriber terminal based on the current geographical location of the subscriber terminal and forecasting likely destination from the subscriber terminal's current location and direction of movement. In an embodiment, a highest priority level is assigned to a subscriber terminal having residence in an epicenter area and being currently located in the epicenter area. In another embodiment of the present invention, a lowest priority level is assigned to a subscriber terminal not having residence in an epicenter area. Based on the priority levels assigned, EWMs are disseminated to the intended subscriber terminals.

Advantageously, the present invention eliminates the requirement of users/subscribers to register with the early warning unit. Further, the present invention provides an effective solution to send early warning messages and communicating the same to all the intended recipients in a short time interval taking into account the dynamics of the subscriber terminal. Moreover, the present invention enables reduction in the number of duplicated messages sent to the users/subscribers and thus overcome the difficulties posed by clogged network.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

The invention claimed is:

1. A method for disseminating Early Warning Messages (EWMs) to one or more subscriber terminals by an Early Warning Unit (EWU) in a mobile communication network, the method comprising the steps of:
   identifying at least one base station in a first region for disseminating the EWMs;
   sending a trigger signal to the at least one base station for initiating the dissemination of the EWMs;
   sending a request by the at least one base station to one or more peer base stations in a second region, the request being an invitation to participate in the dissemination of the EWMs;
   receiving subscriber details of the one or more subscriber terminals by the EWU, wherein the subscriber details of the one or more subscriber terminals are sent by the at least one base station and the one or more peer base stations; and
   selectively disseminating the EWMs to the one or more subscriber terminals based on location details of the subscriber terminals using a grid computing architecture, wherein the grid computing architecture facilitates parallel dissemination of the EWMs to the one or more subscriber terminals by splitting the subscriber details into one or more data fragments.

2. The method of claim 1 further comprising receiving subscriber details of the one or more subscriber terminals serviced by the at least one base station in a second region.

3. The method of claim 2, wherein the first region is an epicenter region of one or more natural calamities and the second region is a region adjoining the first region.

4. The method of claim 1, wherein the at least one base station is identified based on matching geographical location of the at least one base station with data pertaining to the first region.

5. The method of claim 1, wherein the step of selectively disseminating the EWMs further comprises the steps of:
  assigning a priority level to each subscriber terminal based on the geographical location of the one or more subscriber terminals; and
  disseminating the EWMs to the one or more subscriber terminals based on the corresponding priority levels.

6. The method of claim 5, wherein a highest priority level is assigned to a subscriber terminal having residence in an epicenter area and being currently located in the epicenter area.

7. The method of claim 5, wherein a lowest priority is assigned to a subscriber terminal not having residence in an epicenter area and not being currently located in the epicenter area.

8. The method of claim 1 further comprising sending a message to the one or more peer base stations by the at least one base station, wherein the message directs the one or more peer base stations to deliver the EWMs to the EWU for dissemination.

9. A system for disseminating Early Warning Messages (EWMs) to one or more subscriber terminals by an Early Warning Unit (EWU) in a mobile communication network, the system comprising:
  one or more subscriber terminals;
  one or more base stations, each base station comprising;
  a receiving unit configured to receive a trigger signal from the EWU;
  a first transmitting unit configured to send a request by a base station to at least one peer base station, the request being an invitation to participate in dissemination of EWMs to at least one subscriber terminal;
  a second transmitting unit configured to send subscriber details of the subscriber terminals to the EWU; and
  an output unit configured to deliver the EWMs to the EWU for selective dissemination of the EWMs to the subscriber terminals; and
  the EWU comprising:
  a first output unit configured to send a trigger signal to the one or more base stations;
  a first database configured to maintain updated subscriber details serviced by the one or more base stations; and
  a second output unit configured to facilitate selective dissemination of the EWMs to the one or more subscriber terminals and to employ a grid computing architecture for facilitating parallel dissemination of the EWMs to the one or more subscriber terminals.

10. The system of claim 9, wherein the EWU further comprises a second database configured to store details of the one or more base stations.

11. The system of claim 9, wherein the EWU further comprises a third database configured to store details of regions prone to risk of one or more natural calamities.

12. The system of claim 9, wherein the EWU further comprises an identifying unit configured to identify at least one base station in at least one region prone to risk of one or more natural calamities.

13. The system of claim 9, wherein the one or more base stations further comprises an input/output unit configured to send or receive message to or from the at least one peer base stations to deliver the EWMs to the EWU.

14. The system of claim 9, wherein the second output unit is configured to facilitate selective dissemination of the EWMs to the one or more subscriber terminals by assigning a priority level to each subscriber terminal based on geographical location of the subscriber terminal.

15. A computer program product comprising a non-transitory computer usable medium having a computer readable program code embodied therein for disseminating Early Warning Messages (EWMs) to one or more subscriber terminals by an Early Warning Unit (EWU) in a mobile communication network, the computer program product comprising:
  program instruction means for identifying at least one base station in a first region for disseminating the EWMs;
  program instruction means for sending a trigger signal to the at least one base station for initiating the dissemination of the EWMs;
  program instruction means for sending a request by the at least one base station to one or more peer base stations in a second region, the request being an invitation to participate in the dissemination of the EWMs;
  program instruction means for receiving subscriber details of the one or more subscriber terminals by the EWU, wherein the subscriber details of the one or more subscriber terminals are sent by the at least one base station and the one or more peer base stations; and
  program instruction means for selectively disseminating the EWMs to the one or more subscriber terminals based on location details of the subscriber terminals using a grid computing architecture, wherein the grid computing architecture facilitates parallel dissemination of the EWMs to the one or more subscriber terminals by splitting the subscriber details into one or more data fragments.

16. The computer program product of claim 15 further comprising program instruction means for receiving subscriber details of the one or more subscriber terminals serviced by the at least one base station in a second region.

17. The computer program product of claim 15, wherein program instruction means for selectively disseminating the EWMs further comprises:
  program instruction means for assigning a priority level to each subscriber terminal based on the geographical location of the one or more subscriber terminals; and
  program instruction means for disseminating the EWMs to the one or more subscriber terminals based on the corresponding priority levels.

18. The computer program product of claim 15 further comprising program instruction means for sending a message to the one or more peer base stations by the at least one base station, wherein the message directs the one or more peer base stations to deliver the EWMs to the EWU for dissemination.

* * * * *